United States Patent
Zhou et al.

(10) Patent No.: US 9,264,106 B2
(45) Date of Patent: Feb. 16, 2016

(54) METHOD FOR CONTROLLING FLOWS OF LOGICAL LINK LAYER IN NEAR FIELD COMMUNICATION SOFTWARE STACK

(71) Applicant: HUIZHOU TCL MOBILE COMMUNICATION CO., LTD., Huizhou, Guangdong (CN)

(72) Inventors: Baozhong Zhou, Huizhou (CN); Kun Xiao, Huizhou (CN); Jie Shen, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 14/388,078

(22) PCT Filed: Jul. 24, 2013

(86) PCT No.: PCT/CN2013/079965
§ 371 (c)(1),
(2) Date: Sep. 25, 2014

(87) PCT Pub. No.: WO2014/086154
PCT Pub. Date: Jun. 12, 2014

(65) Prior Publication Data
US 2015/0065040 A1    Mar. 5, 2015

(30) Foreign Application Priority Data
Dec. 6, 2012  (CN) .......................... 2012 1 0518744

(51) Int. Cl.
*H04B 5/00* (2006.01)
*H04L 12/807* (2013.01)
(Continued)

(52) U.S. Cl.
CPC ............ *H04B 5/0031* (2013.01); *H04L 1/1809* (2013.01); *H04L 1/1825* (2013.01);
(Continued)

(58) Field of Classification Search
CPC ... H04B 5/0031; H04B 7/2656; H04W 4/008; H04L 47/27; H04L 1/1832; H04L 1/0007
See application file for complete search history.

(56) References Cited

U.S. PATENT DOCUMENTS 6,198,941 B1 *  3/2001  Aho ........................ H04L 67/04
                                                    455/552.1
7,283,474 B1    10/2007  Bergenwall
(Continued)

FOREIGN PATENT DOCUMENTS

CN          101159520 A      4/2008
CN          101895332 A      11/2010
(Continued)

OTHER PUBLICATIONS

International Search Report dated Oct. 12, 2013; PCT/CN2013/079965.

*Primary Examiner* — Andrew Wendell
(74) *Attorney, Agent, or Firm* — Ladas & Parry LLP

(57) ABSTRACT

A method for controlling flows of a logical link layer in a near field communication (NFC) software stack includes steps of: arranging a Send Window and a Receive Window in the logical link layer for controlling flows of transmitted data frames; adjusting the size of the Send Window and the size of the Receive Window according to a transfer rate determined based on upper-layer application, communication delay time determined based on channel quality, and the size of a data frame; and controlling flows of the output terminal according to the size of the Send Window, and controlling flows of the input terminal according to the size of the Receive Window.

13 Claims, 3 Drawing Sheets

(51) Int. Cl.
*H04L 1/00* (2006.01)
*H04L 1/18* (2006.01)
*H04W 4/00* (2009.01)
*H04W 72/04* (2009.01)

(52) U.S. Cl.
CPC ............. *H04L1/1832* (2013.01); *H04W 4/008* (2013.01); *H04W 72/0446* (2013.01); *H04L 47/27* (2013.01); *Y02B 60/31* (2013.01)

(56) References Cited

U.S. PATENT DOCUMENTS

| | | | | |
|---|---|---|---|---|
| 2005/0058131 | A1* | 3/2005 | Samuels | H04L 12/24 370/389 |
| 2005/0071451 | A1* | 3/2005 | Key | H04L 47/10 709/223 |
| 2007/0280111 | A1* | 12/2007 | Lund | H04L 47/10 370/235 |
| 2008/0095247 | A1* | 4/2008 | Ohno | H04L 1/0002 375/240.28 |
| 2008/0186945 | A1* | 8/2008 | Ahn | H04L 1/16 370/349 |
| 2009/0109866 | A1* | 4/2009 | Kim | H04L 1/0002 370/252 |
| 2009/0168720 | A1* | 7/2009 | Vinayakray-Jani | H04W 80/06 370/331 |
| 2010/0074132 | A1* | 3/2010 | Shen | H04L 65/80 370/252 |

FOREIGN PATENT DOCUMENTS

| | | | | |
|---|---|---|---|---|
| CN | 102664867 | A | 9/2012 | |
| CN | 103051558 | A | 4/2013 | |
| EP | 1833211 | * | 9/2007 | ............. H04L 12/56 |

* cited by examiner

METHOD FOR CONTROLLING FLOWS OF LOGICAL LINK LAYER IN NEAR FIELD COMMUNICATION SOFTWARE STACK

BACKGROUND OF THE INVENTION

1. Field of the Invention

The present invention relates to the field of wireless communication technology, and more particularly, to a method for controlling flows of a logical link layer in near field communication (NFC) software stack.

2. Description of the Prior Art

Contactless radio frequency identification (RFID) technology and interconnection and intercommunication technology are integrated and the NFC technology is produced. To improve development and popularity of the NFC technology, an NFC forum is organized by the industry. The NFC forum defines the NFC protocol system where the NFC software stack is a middleware for supporting applying development in the upper layer and for operating an NFC controller in the lower layer. A data connecting layer is arranged in the NFC software stack. The data connecting layer is basically used for transferring transparent and reliable data to a user of its layer. In addition, the data connecting layer is used for framing, error correction, conservation, and flow control.

A traditional NFC Forum Logical Link Protocol does not regulate the size of a Receive Window; instead, the size of the Receive Window is recommended to be zero to 15 in the Protocol. The NFC Protocol has a physical layer, which is a wireless communication protocol, and the physical layer tends to make troubles. The smaller the Receive Window is, the larger the bandwidth needs. The Logical Link Protocol is a Peer to Peer (P2P) business service. This kind of business service has a larger amount of data and a larger corresponding data frame. Thus, a larger buffer zone is required when the size of the Receive Window is much larger. However, the NFC software stack works in an embedded environment, so memory resource of the NFC software stack is relatively limited. Once the buffer zone becomes larger, the performance of the system will be affected.

In addition, a plurality of NFC controller chips support the P2P application only in the passive mode. The mode is a half-duplex working mode, which means that the actions "send" and "receive" take turns. If the size of the Send Window and the size of the Receive Window are too large, one of the communicators is in state of sending and resending all the time, and the other is deprived of sending time, resulting in the struggle between unbalance of bandwidth utilization and consumption of memory resource.

Therefore, the conventional technology has room to be improved.

SUMMARY OF THE INVENTION

In light of imperfectness of the conventional technology, an object of the present invention is to provide a method for controlling flows of a logical link layer in an NFC software stack for solving problems such as unbalance of bandwidth utilization and large consumption of memory resource in the NFC in the conventional technology.

According to the present invention, a method for controlling flows of a logical link layer in a near field communication (NFC) software stack, comprises steps of:

Step A: arranging a Send Window and a Receive Window in the logical link layer for controlling flows of transmitted data frames;

Step B: adjusting the size of the Send Window and the size of the Receive Window according to a transfer rate determined based on upper-layer application, communication delay time determined based on channel quality, and the size of a data frame, and the size of the Receive Window satisfying an equation taking on the form of Receive Window=[FWT× DATARATE_MAX]/[(2+Link Miu)×8] where Receive Window represents the size of the Receive Window, FWT represents the communication delay time, DATARATE_MAX represents transfer rate, and Link Miu represents a parameter designated when an output terminal and an input terminal are connected, and FWT and DATARATE_MAX being read by an NFC controller at the input terminal; and Step C: controlling flows of the output terminal according to the size of the Send Window, and controlling flows of the input terminal according to the size of the Receive Window.

In one aspect of the present invention, the transfer rate is 106 Kbps (bit rate), 212 Kbps, or 424 Kbps.

In another aspect of the present invention, a buffer zone is constructed at the input terminal for buffering the received data frame.

In another aspect of the present invention, that the input terminal receives the data frame comprises steps of:

Step A1: receiving the data frame sent by the output terminal through the input terminal;

Step A2: judging a serial number of the data frame to be in the Receive Window;

Step A3: judging the serial number of the data frame to be the lower threshold of the Receive Window when the serial number of the data frame is in the Receive Window;

Step A4: moving a data frame corresponding to the serial number of the data frame to the buffer zone when the serial number of the data frame is not the lower threshold of the Receive Window;

Step A5: looking up the data frame forming a continuous series with the serial numbers of the data frame in the buffer zone when the serial number of the data frame is the lower threshold of the Receive Window;

Step A6: returning a confirmation frame to the input terminal when the data frame forming a continuous series with the serial numbers of the data frame is not found in the buffer zone, and confirming the serial number of the data frame is the data frame in the lower threshold of the Receive Window; and Step A7: forming the received data frame and the data frame capable of forming a continuous series to form a data frame unit when the data frame forming a continuous series with the serial numbers of the data frame is found in the buffer zone, returning a confirmation frame to the input terminal, confirming to receive a data frame having a largest serial number in the data frame unit: an i data frame.

In another aspect of the present invention, after the confirmation frame is returned according to Step A7, the lower threshold of the Receive Window set as FrameExpected=i+1, and the upper threshold of the Receive Window set as Too-Far=(i+Receive Window)MOD(MaxSeq+1) in which FrameExpected represents the lower threshold of the Receive Window, TooFar represents the upper threshold of the Receive Window, MaxSeq represents the maximal value of the serial number of a wait-to-be-transferred data frame, and MOD represents modulo operation.

In still another aspect of the present invention, the number one is added to the upper threshold of the Send Window when the output terminal sends a new data frame.

In yet another aspect of the present invention, the confirmation frame is checked to be a confirmation frame corresponding to the lower threshold of the Send Window when the output terminal receives the confirmation frame returned by the input terminal, if it is, the number one is added to the lower threshold of the Send Window, and if not, the number one is added to the serial number of the confirmation frame for being the lower threshold of a new Send Window.

According to the present invention, a method for controlling flows of a logical link layer in a near field communication (NFC) software stack comprises steps of:

Step A: arranging a Send Window and a Receive Window in the logical link layer for controlling flows of transmitted data frames;

Step B: adjusting the size of the Send Window and the size of the Receive Window according to a transfer rate determined based on upper-layer application, communication delay time determined based on channel quality, and the size of a data frame; and Step C: controlling flows of the output terminal according to the size of the Send Window, and controlling flows of the input terminal according to the size of the Receive Window.

In one aspect of the present invention, the size of the Receive Window satisfying an equation taking on the form of Receive Window=[FWT×DATARATE_MAX]/[(2+Link Miu)×8] where Receive Window represents the size of the Receive Window, FWT represents the communication delay time, DATARATE_MAX represents transfer rate, and Link Miu represents a parameter designated when an output terminal and an input terminal are connected.

In another aspect of the present invention, the transfer rate is 106 Kbps (bit rate), 212 Kbps, or 424 Kbps.

In another aspect of the present invention, a buffer zone is constructed at the input terminal for buffering the received data frame.

In another aspect of the present invention, that the input terminal receives the data frame comprises steps of:

Step A1: receiving the data frame sent by the output terminal through the input terminal;

Step A2: judging a serial number of the data frame to be in the Receive Window;

Step A3: judging the serial number of the data frame to be the lower threshold of the Receive Window when the serial number of the data frame is in the Receive Window;

Step A4: moving a data frame corresponding to the serial number of the data frame to the buffer zone when the serial number of the data frame is not the lower threshold of the Receive Window;

Step A5: looking up the data frame forming a continuous series with the serial numbers of the data frame in the buffer zone when the serial number of the data frame is the lower threshold of the Receive Window;

Step A6: returning a confirmation frame to the input terminal when the data frame forming a continuous series with the serial numbers of the data frame is not found in the buffer zone, and confirming the serial number of the data frame is the data frame in the lower threshold of the Receive Window; and Step A7: forming the received data frame and the data frame capable of forming a continuous series to form a data frame unit when the data frame forming a continuous series with the serial numbers of the data frame is found in the buffer zone, returning a confirmation frame to the input terminal, confirming to receive a data frame having a largest serial number in the data frame unit: an i data frame.

In another aspect of the present invention, after the confirmation frame is returned according to Step A7, the lower threshold of the Receive Window set as FrameExpected=i+1, and the upper threshold of the Receive Window set as Too-Far=(i+Receive Window)MOD(MaxSeq+1) in which FrameExpected represents the lower threshold of the Receive Window, TooFar represents the upper threshold of the Receive Window, MaxSeq represents the maximal value of the serial number of a wait-to-be-transferred data frame, and MOD represents modulo operation.

In still another aspect of the present invention, the number one is added to the upper threshold of the Send Window when the output terminal sends a new data frame.

In yet another aspect of the present invention, the confirmation frame is checked to be a confirmation frame corresponding to the lower threshold of the Send Window when the output terminal receives the confirmation frame returned by the input terminal, if it is, the number one is added to the lower threshold of the Send Window, and if not, the number one is added to the serial number of the confirmation frame for being the lower threshold of a new Send Window.

Compared with the conventional technology, the present invention has benefits of balancing bandwidth utilization and greatly reducing consumption of memory resource by arranging a Send Window and a Receive Window in the logical link layer for controlling flows of transmitted data frames and adjusting the size of the Send Window and the size of the Receive Window dynamically based on upper-layer application, channel quality, and the size of the data frame.

DETAILED DESCRIPTION OF THE PREFERRED EMBODIMENTS

In order to illustrate the technique and effects of the present invention, a detailed description will be disclosed by the following disclosure in conjunction with figures.

Figure 1:
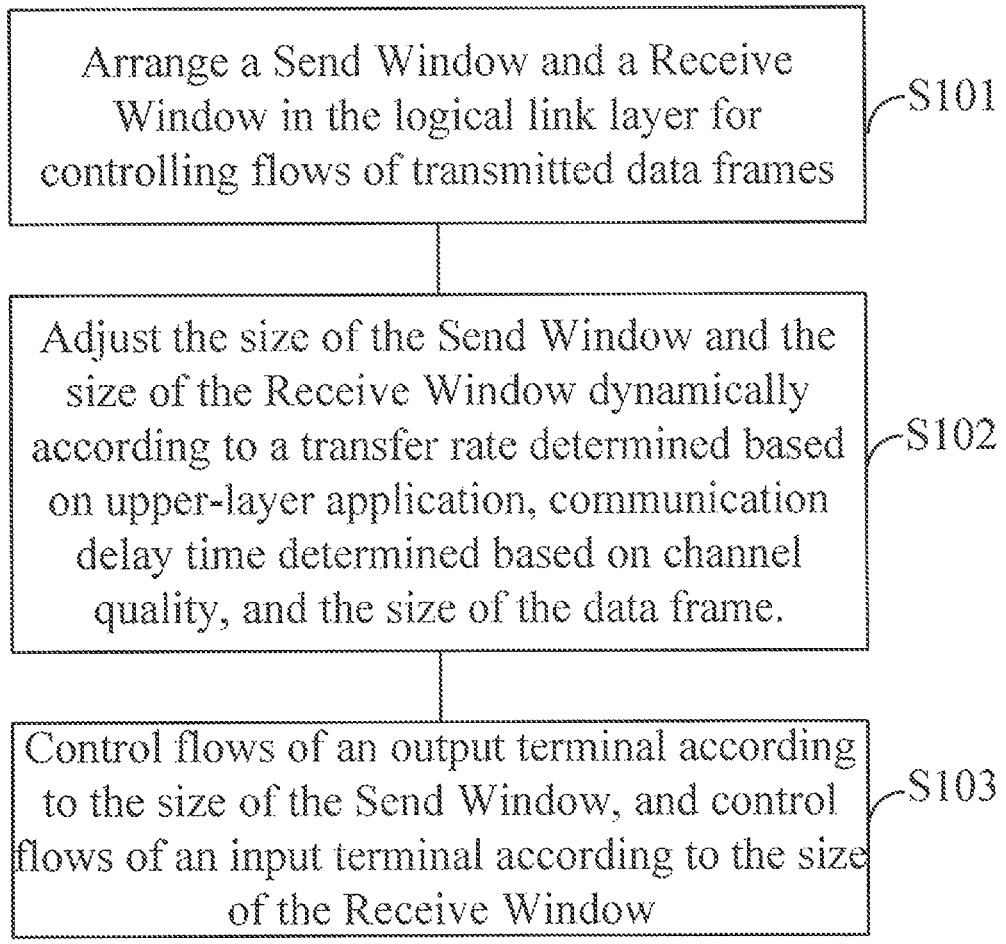
FIG. 1 shows a flowchart of a method for controlling flows of a logical link layer in an NFC software stack according to a preferred embodiment of the present invention.

Please refer to FIG. 1 showing a flowchart of a method for controlling flows of a logical link layer in an NFC software stack according to a preferred embodiment of the present invention. The method comprises following steps of:

S101: arranging a Send Window and a Receive Window in the logical link layer for controlling flows of transmitted data frames;

S102: adjusting the size of the Send Window and the size of the Receive Window dynamically according to a transfer rate determined based on upper-layer application, communication delay time determined based on channel quality, and the size of the data frame;

S103: controlling flows of an output terminal according to the size of the Send Window, and controlling flows of an input terminal according to the size of the Receive Window.

The size of the Send Window takes on the form of Send Window=(NextFrameToSend−AckExpected)MOD(MaxSeq+1) where Send Window represents the size of the Send Window, NextFrameToSend represents the upper threshold of the Send Window, AckExpected represents the lower threshold of the Send Window, and MaxSeq represents the maximal value of the serial number of the wait-to-be-transferred data frame. The meaning of these terms is that the upper threshold of the Send Window is a serial number of a data frame waited to be transferred next via the output terminal; the lower threshold of the Send Window is the minimal serial number of a data frame which has been transferred via the output terminal but has not been received; the maximal serial number of the data frame is the maximal serial number of a wait-to-be-transferred data frame.

The size of the Receive Window takes on the form of TooFar=(FrameExpected+Receive Window)MOD(MaxSeq+1) where TooFar represents the upper threshold of the Receive Window, FrameExpected represents the lower threshold of the Receive Window, MaxSeq represents the maximal value of the serial number of a wait-to-be-transferred data frame, and Receive Window represents the size of the Receive Window. The meaning of these terms is that the upper threshold of the Receive Window is the maximal serial number of a data frame allowed to be received by the input terminal; the lower threshold of the Receive Window is the serial number of a data frame which will be received by the input terminal.

MOD, representing modulo operation, is a frequently used binary operation. For example, when the form of a=bq+r where q is an integral and the integral is maximal stands, aMODb=r stands. In addition, the steps in this embodiment are not specifically arranged. The arrangement of the above-mentioned steps is merely for explanations. The Send Window at the output terminal and the Receive Window at the input terminal are adjusted through the steps. In this way, bandwidth utilization of the Send Window and the Receive Window is balanced better, and the memory resource is consumed less.

The Send Window and the Receive Window will be detailed in the following.

Figure 2:
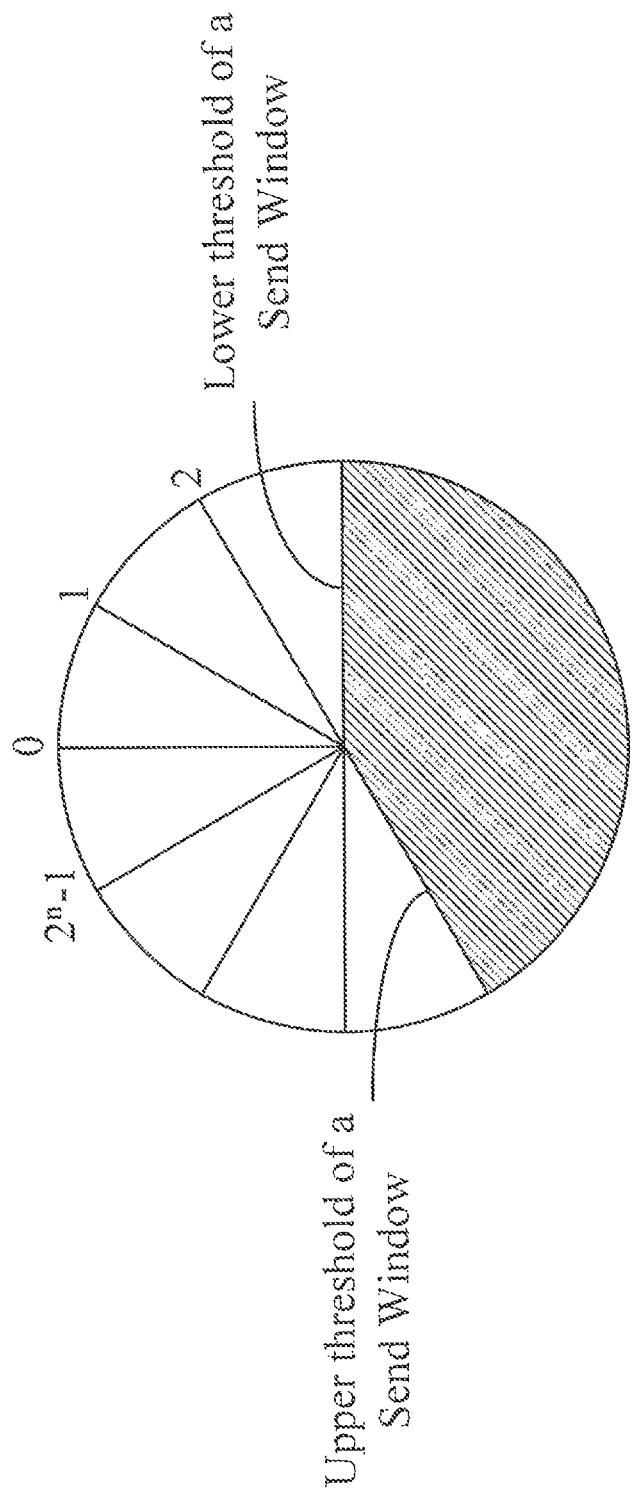
FIG. 2 illustrates a schematic diagram of a Send Window according to a preferred embodiment of the present invention.

The Send Window is used for controlling flows of the output terminal. The Send Window denotes a table of serial numbers of data frames that is sent by the output terminal without receiving a confirmation frame. FIG. 2 shows the Send Window with the biggest size of $2^n$. The serial number of the data frame is from zero to $2^n-1$. The serial number $2^n-1$ is the biggest serial number of the data frame. The black part between the upper threshold of the Send Window and the lower threshold of the Send Window represents the size of the Send Window (the table of the serial numbers of the frames that is sent by the output terminal without receiving the confirmation frame). When the output terminal sends a new data frame, the supreme value of the Send Window is chosen to be the serial number of the data frame and the number one is added to the upper threshold of the Send Window. When the output terminal receives the confirmation frame at the lower threshold of the Send Window, the number one is added to the lower threshold of the Send Window. When the output terminal receives the confirmation frame which is not at the lower threshold of the Send Window (that is, the serial number is smaller than the upper threshold of the Send Window), the number one is added to a serial number corresponding to the confirmation frame and the new number is set as the lower threshold of the Send Window to adjust the Send Window and to continue to control the flows of the output terminal.

The Receive Window determines that the input terminal receives what kind of data frame. The input terminal only receives the serial number of the data frame within the Receive Window. The upper threshold of the Receive Window represents a data frame having the largest serial number is received by the input terminal. The lower threshold of the Receive Window represents a data frame having a desired serial number is received by the input terminal. Any data frame outside the Receive Window is bound to be discarded.

To balance the struggle between bandwidth utilization and consumption of memory resource, instead of adopting the conventional technology where the size of the Send Window and the size of the Receive Window are statically designated based on empirical values, the size of the Send Window and the size of the Receive Window are dynamically calculated based on the upper-layer application, the channel quality, and the size of the data frame in each communication in the present invention.

Take the input terminal for example. The upper-layer application ensures the transfer rate of communication. The transfer rate may be 106 Kbps (bit rate), 212 Kbps, or 424 Kbps. The variable DATARATE_MAX represents the transfer rate (generally, the transfer rate is the maximal transfer rate ensured in the upper-layer application). The variable DATARATE_MAX can be read in a generic gate (ETSI TS 102 622 standard nomenclature) of the NFC controller at the input terminal in communication.

The channel quality ensures the communication delay time between two NFC devices. The communication delay time is from 302 us to 4949 ms. A variable FWT indicates the communication delay time. The variable FWT will be read from the generic gate in the NFC controller at the input terminal when the communication works.

The size of data frames adopted in the Logical Link Control Protocol differs with different communication objects. Communicators have to specify Link Maximum Information Unit (Link MIU) to connect to each other. The size of data frames can be calculated based on the Link MIU.

In this way, a desired parameter is produced. Then, the size of the Receive Window takes on the form:

Receive Window=$[FWT \times DATARATE\_MAX]/[(2+Link\ Miu) \times 8]$

Meanwhile, the size of the Send Window is designed to be identical to the size of the Receive Window. But the variables FWT and DATARATE_MAX are read by the NFC controller at the output terminal to obtain the size of the Send Window. The above-mentioned steps solve the struggle between bandwidth utilization and memory resource consumption successfully. The size of the Send Window and the size of the Receive Window are dynamically adjustable instead of statically designated. In this way, the bandwidth utilization is balanced and the memory resource is consumed less.

Figure 3:
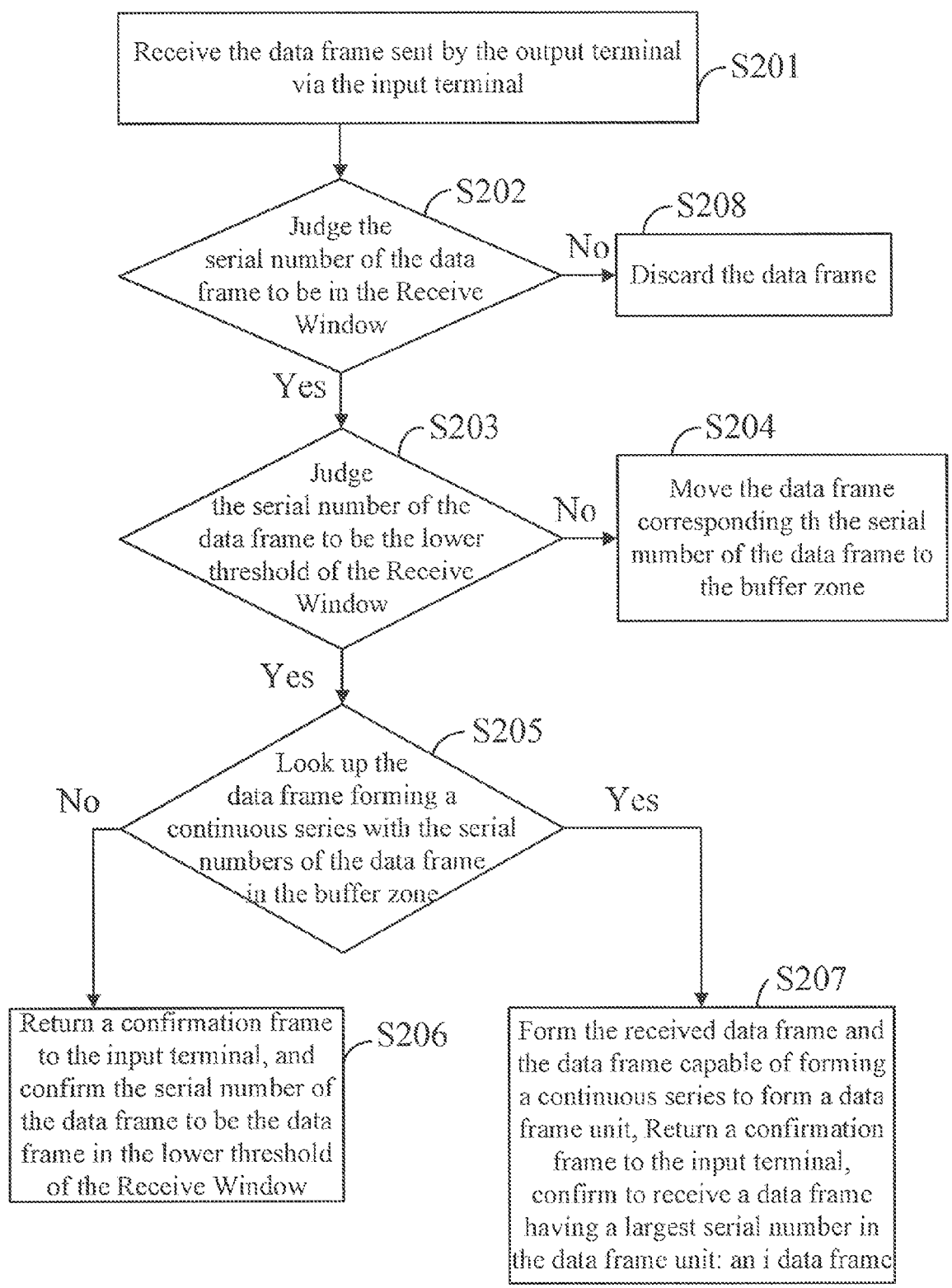
FIG. 3 shows a flowchart of receiving data frame according to a preferred embodiment of the present invention.

For the input terminal, a buffer zone is built at the input terminal for buffering the received data frame. When a data frame from the Receive Window and not from the lower threshold of the Receive Window is received, the data frame is deposited in the buffer zone. FIG. 3 shows steps comprising:

S201: receiving the data frame sent by the output terminal via the input terminal;

S202: judging the serial number of the data frame to be in the Receive Window;

S203: judging the serial number of the data frame to be the lower threshold of the Receive Window when the serial number of the data frame is in the Receive Window; deleting the data frame once the serial number of the data frame is not in the Receive Window and entering Step 208;

S204: moving the data frame corresponding to the serial number of the data frame to the buffer zone when the serial number of the data frame is not the lower threshold of the Receive Window;

S205: looking up the data frame forming a continuous series with the serial numbers of the data frame in the buffer zone when the serial number of the data frame is the lower threshold of the Receive Window;

S206: returning a confirmation frame to the input terminal when the data frame forming a continuous series with the serial numbers of the data frame is not found in the buffer zone, and confirming the serial number of the data frame to be the data frame in the lower threshold of the Receive Window;

S207: forming the received data frame and the data frame capable of forming a continuous series to form a data frame unit when the data frame forming a continuous series with the serial numbers of the data frame is found in the buffer zone, returning a confirmation frame to the input terminal, confirming to receive a data frame having a largest serial number in the data frame unit: an i data frame;

S208: discarding the data frame.

After the confirmation frame is returned according to Step S207, the Receive Window is adjusted: the lower threshold of the Receive Window set as FrameExpected=i+1, and the upper threshold of the Receive Window set as TooFar=(i+Receive Window)MOD(MaxSeq+1).

In sum, the present invention has benefits of balancing bandwidth utilization and reducing consumption of memory resource by arranging a Send Window and a Receive Window in the logical link layer for controlling flows of transmitted data frames and adjusting the size of the Send Window and the size of the Receive Window dynamically based on the upper-layer application, the channel quality, and the size of the data frame.

The present invention has been described with reference to certain preferred and alternative embodiments which are intended to be exemplary only and not limited to the full scope of the present invention as set forth in the appended claims.

What is claimed is:

1. A method for controlling flows of a logical link layer in a near field communication (NFC) software stack, comprising steps of:

Step A: using a device comprising an NFC controller chip to execute program instructions to arrange a Send Window and a Receive Window in the logical link layer for controlling flows of transmitted data frames;

Step B: using the NFC controller chip to execute the program instruction to adjust the size of the Send Window and the size of the Receive Window according to a transfer rate determined based on upper-layer application, communication delay time determined based on channel quality, and the size of a data frame, and the size of the Receive Window satisfying an equation taking on the form of Receive Window=[FWT×DATARATE_MAX]/[(2+Link Miu)×8] where Receive Window represents the size of the Receive Window, FWT represents the communication delay time, DATARATE_MAX represents transfer rate, and Link Miu represents a parameter designated when an output terminal and an input terminal are connected, and FWT and DATARATE_MAX being read by an NFC controller at the input terminal; and Step C: using the NFC controller chip to execute the program instructions to control flows of the output terminal according to the size of the Send Window, and controlling flows of the input terminal according to the size of the Receive Window.

2. The method as claimed in claim 1, wherein the transfer rate is 106 Kbps (bit rate), 212 Kbps, or 424 Kbps.

3. The method as claimed in claim 1, wherein a buffer zone is constructed at the input terminal for buffering the received data frame.

4. The method as claimed in claim 3, wherein that the input terminal receives the data frame comprises steps of:

Step A1: receiving the data frame sent by the output terminal through the input terminal;

Step A2: judging a serial number of the data frame to be in the Receive Window;

Step A3: judging the serial number of the data frame to be the lower threshold of the Receive Window when the serial number of the data frame is in the Receive Window;

Step A4: moving a data frame corresponding to the serial number of the data frame to the buffer zone when the serial number of the data frame is not the lower threshold of the Receive Window;

Step A5: looking up the data frame forming a continuous series with the serial numbers of the data frame in the buffer zone when the serial number of the data frame is the lower threshold of the Receive Window;

Step A6: returning a confirmation frame to the input terminal when the data frame forming a continuous series with the serial numbers of the data frame is not found in the buffer zone, and confirming the serial number of the data frame is the data frame in the lower threshold of the Receive Window; and Step A7: forming the received data frame and the data frame capable of forming a continuous series to form a data frame unit when the data frame forming a continuous series with the serial numbers of the data frame is found in the buffer zone, returning a confirmation frame to the input terminal, confirming to receive a data frame having a largest serial number in the data frame unit: an i data frame.

5. The method as claimed in claim 4, wherein after the confirmation frame is returned according to Step A7, the lower threshold of the Receive Window set as FrameExpected=i+1, and the upper threshold of the Receive Window set as TooFar=(i+Receive Window)MOD(MaxSeq+1) in which FrameExpected represents the lower threshold of the Receive Window, TooFar represents the upper threshold of the Receive Window, MaxSeq represents the maximal value of the serial number of a wait-to-be-transferred data frame, and MOD represents modulo operation.

6. The method as claimed in claim 5, wherein the number one is added to the upper threshold of the Send Window when the output terminal sends a new data frame.

7. The method as claimed in claim 5, wherein the confirmation frame is checked to be a confirmation frame corresponding to the lower threshold of the Send Window when the output terminal receives the confirmation frame returned by the input terminal, if it is, the number one is added to the lower threshold of the Send Window, and if not, the number one is added to the serial number of the confirmation frame for being the lower threshold of a new Send Window.

8. A method for controlling flows of a logical link layer in a near field communication (NFC) software stack, comprising steps of:

Step A: using a device comprising an NFC controller chip to execute program instructions to arrange a Send Window and a Receive Window in the logical link layer for controlling flows of transmitted data frames;

Step B: using the NFC controller chip to execute the program instructions to adjust the size of the Send Window and the size of the Receive Window according to a transfer rate determined based on upper-layer application, communication delay time determined based on channel quality, and the size of a data frame, wherein the size of the Receive Window satisfying an equation taking on the form of Receive Window=[FWT×DATARATE_MAX]/[(2+Link Miu)×8] where Receive Window represents the size of the Receive Window, FWT represents the communication delay time, DATARATE_MAX represents transfer rate, and Link Miu represents a parameter designated when an output terminal and an input terminal are connected, and wherein a buffer zone is constructed at the input terminal for buffering the received data frame; and Step C: using the NFC controller chip to execute the program instructions to control flows of the output terminal according to the size of the Send Window, and controlling flows of the input terminal according to the size of the Receive Window.

9. The method as claimed in claim 8, wherein the transfer rate is 106 Kbps (bit rate), 212 Kbps, or 424 Kbps.

10. The method as claimed in claim 8, wherein that the input terminal receives the data frame comprises steps of:

Step A1: receiving the data frame sent by the output terminal through the input terminal;

Step A2: judging a serial number of the data frame to be in the Receive Window,

Step A3: judging the serial number of the data frame to be the lower threshold of the Receive Window when the serial number of the data frame is in the Receive Window;

Step A4: moving a data frame corresponding to the serial number of the data frame to the buffer zone when the serial number of the data frame is not the lower threshold of the Receive Window;

Step A5: looking up the data frame forming a continuous series with the serial numbers of the data frame in the buffer zone when the serial number of the data frame is the lower threshold of the Receive Window;

Step A6: returning a confirmation frame to the input terminal when the data frame forming a continuous series with the serial numbers of the data frame is not found in the buffer zone, and confirming the serial number of the data frame is the data frame in the lower threshold of the Receive Window; and Step A7: forming the received data frame and the data frame capable of forming a continuous series to form a data frame unit when the data frame forming a continuous series with the serial numbers of the data frame is found in the buffer zone, returning a confirmation frame to the input terminal, confirming to receive a data frame having a largest serial number in the data frame unit: an i data frame.

11. The method as claimed in claim 10, wherein after the confirmation frame is returned according to Step A7, the lower threshold of the Receive Window set as FrameExpected=i+1, and the upper threshold of the Receive Window set as TooFar=(i+Receive Window)MOD(MaxSeq+1) in which FrameExpected represents the lower threshold of the Receive Window, TooFar represents the upper threshold of the Receive Window, MaxSeq represents the maximal value of the serial number of a wait-to-be-transferred data frame, and MOD represents modulo operation.

12. The method as claimed in claim 11, wherein the number one is added to the upper threshold of the Send Window when the output terminal sends a new data frame.

13. The method as claimed in claim 11, wherein the confirmation frame is checked to be a confirmation frame corresponding to the lower threshold of the Send Window when the output terminal receives the confirmation frame returned by the input terminal, if it is, the number one is added to the lower threshold of the Send Window, and if not, the number one is added to the serial number of the confirmation frame for being the lower threshold of a new Send Window.

* * * * *